United States Patent
Edman

(10) Patent No.: US 7,486,963 B2
(45) Date of Patent: Feb. 3, 2009

(54) DIRECT CELLULAR COMMUNICATION

(76) Inventor: Lars Edman, Ralambsvagen 54, 1tr., Stockholm (SE) SE-112 56

(*) Notice: Subject to any disclaimer, the term of this patent is extended or adjusted under 35 U.S.C. 154(b) by 499 days.

(21) Appl. No.: 10/529,230

(22) PCT Filed: Sep. 26, 2003

(86) PCT No.: PCT/SE03/01498

§ 371 (c)(1),
(2), (4) Date: Apr. 28, 2005

(87) PCT Pub. No.: WO2004/030387

PCT Pub. Date: Apr. 8, 2004

(65) Prior Publication Data

US 2006/0166687 A1 Jul. 27, 2006

(51) Int. Cl.
*H04M 1/00* (2006.01)
*H04B 7/212* (2006.01)

(52) U.S. Cl. ............... 455/550.1; 455/502; 455/450; 455/517

(58) Field of Classification Search ........... 455/550.1, 455/502, 450, 509, 434, 517; 370/347, 350
See application file for complete search history.

(56) References Cited

U.S. PATENT DOCUMENTS

| 5,758,266 | A | 5/1998 | Kornfeld et al. ........... 455/86 |
| 5,790,527 | A | 8/1998 | Janky et al. .............. 370/330 |
| 6,532,369 | B1* | 3/2003 | Myer ..................... 455/517 |
| 6,865,372 | B2* | 3/2005 | Mauney et al. .......... 455/41.2 |
| 2002/0102974 | A1* | 8/2002 | Raith .................... 455/434 |

FOREIGN PATENT DOCUMENTS

| EP | 0 966 115 A2 | 12/1999 |
| GB | 2 356 532 A | 5/2001 |
| GB | 2 375 461 A | 11/2002 |
| WO | 97/32403 | 9/1997 |

OTHER PUBLICATIONS

International Search Report of PCT/SE03/01498 mailed Dec. 17, 2003.

* cited by examiner

*Primary Examiner*—Melur Ramakrishnaiah
(74) *Attorney, Agent, or Firm*—Nixon & Vanderhye P.C.

(57) ABSTRACT

The invention relates to radio communication in a mobile station operating on cellular frequency bands, and/or on a frequency band separated from cellular frequency bands, for transmitting and receiving calls outside a cellular network through direct communication between cellular mobile stations. It also relates to a method in a cellular telephony system comprising at least two mobile stations communicating.

28 Claims, 8 Drawing Sheets

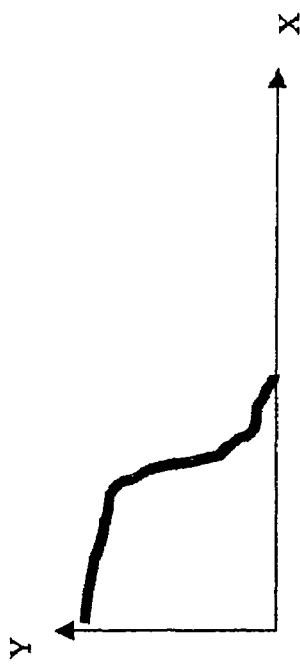
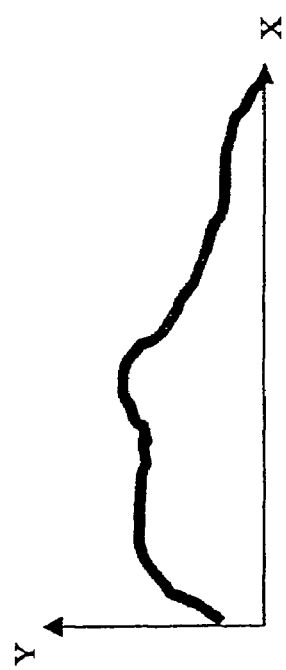
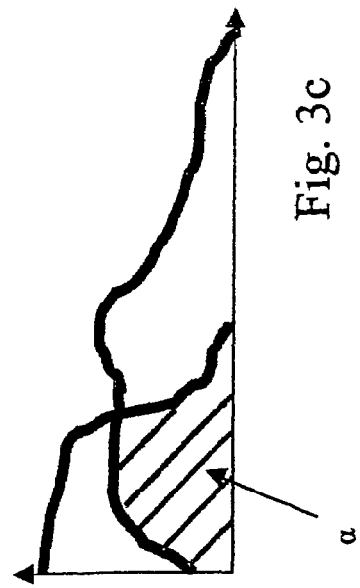
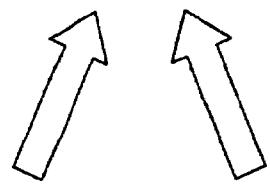

DIRECT CELLULAR COMMUNICATION

This application is the US national phase of international application PCT/SE2003/001498 filed 26 Sep. 2003 which designated the U.S. and claims priority of SE 0202847-0, filed 26 Sep. 2002, the entire contents of each of which are hereby incorporated by reference.

TECHNICAL FIELD

The present invention pertains to a cellular mobile station and a method therefore, comprising a first radio communication means interfacing a cellular network, operating on at least one cellular frequency band, for transmitting and receiving calls through the network. Moreover it comprises a second radio communication means operating on a different frequency band, separated from cellular frequency bands, for transmitting and receiving calls outside a cellular network through direct communication between cellular mobile stations

BACKGROUND ART

Currently, the market for cellular mobile equipment consists of suppliers of mobile networks and mobile phones, operators, and customers. Due to the general lack of capacity in the present mobile networks, as well as due to the introduction of new (potential) applications and services in need of high bandwidth, there is an urge on further increasing capacity in mobile network systems. New applications and services, often including the transmission of e.g. pictures and/or movies, provides that the demand for bandwidth is much larger than current mobile networks are able to supply.

To ensure that a need for necessary bandwidth in coming high-bandwidth applications and services, large investments in developments of a new infrastructure are made by the suppliers of mobile networks. The operators, on their side, are forced to purchase the necessary new licenses needed in order to operate the new infrastructure. At the end, it is the customer who pays the price for combined efforts accomplished by suppliers of mobile networks and operators, making end-customers costs for high-bandwidth mobile telephone services become unrealistically high. Also second-generation mobile networks, such as GSM, suffer from a general lack of capacity and are in demand of an increased growth of capacity.

The US patent document US 2002/0014990 by Kimura discloses a "Radio Communication Device and Method of Measuring Distance". A distance measurement is accomplished by sending a pilot signal between two portable telephones via a radio interface for short distance.

Patent application GB-A-2 356 532 teaches how to improve the quality of radio signals by switching calls between the cellular network and direct communication between mobile stations by utilizing the frequency bands of the cellular network when the signal quality is better for direct communication then for communication in the network. This is provided through combination techniques for diversity, i.e., the utilization of several antennas receiving the same signal, whereby the signal received at the antenna with the largest signal strength is utilized. GB-A-2 356 532 utilizes the same frequency band for cellular network carried traffic and direct communication between mobile stations. At direct communication the invention in GB-A-2 356 532 so to speak "steals" capacity from the traffic channel TCH in a GSM system, which not aims to extend the system call capacity. Moreover GB-A-2 356 532 does not suggest a cellular phone.

SUMMARY OF INVENTION

The present invention relates to a cellular mobile station (MS) and a method in a cellular telephony system comprising at least two mobile stations communicating. The MS is equipped with an additional radio communication means for direct communication between two MS releasing communication from the cellular mobile system when a call is established. This could be used to obtain a capacity increase in a mobile telephone network and/or saving of costs for mobiles that are communicating.

To achieve the aims and goals of the present invention it sets forth a cellular mobile station comprising a first radio communication means interfacing a cellular network, operating on at least one cellular frequency band, for transmitting and receiving calls through the network. The mobile station comprises:

a second radio communication means operating on a different frequency band, separated from cellular frequency bands, for transmitting and receiving calls outside a cellular network through direct communication between cellular mobile stations;

a switching means between the first and the second radio communication means for transferring calls between cellular frequency bands and the different frequency band upon a predetermined command;

means in the second radio communication means determining a carrier wave within the different frequency band for transmitting and receiving a transferred modulated call; and a synchronizing means for establishing a connection for calls over the carrier wave with another predetermined mobile station.

In one embodiment of the present invention, the mobile network is monitoring and controlling the switching means for direct communication between mobile stations by the synchronizing means reading commands on the mobile network control channels.

Another embodiment comprises that the mobile station is utilized as a router that receives information and re-transmits the same information based on an address tag attached to packets of information.

In a further embodiment an ongoing speech call is directed to the network or the direct communication through the switch determined through measurement of signal strength parameters.

A still further embodiment comprises to determine a direct communication is based on cell information in a visitor location register of the network.

The present invention also sets forth a method in a cellular telephony system comprising at least two mobile stations communicating. The mobile stations comprise a first radio communication means interfacing a cellular network. They are operating on at least one cellular frequency band, for transmitting and receiving calls through the network. The method comprises the steps of:

the mobile stations operate, each through a second radio communication means, on a different frequency band, which is separated from cellular frequency bands;

the second radio communication means transmits and receives calls outside a cellular network through direct communication between at least two of the cellular mobile stations;

in the mobile stations switching between the first and the second radio communication means for transferring calls between cellular frequency bands and the different frequency band upon a predetermined command;

in the second radio communication means determining a mutual carrier wave within the different frequency band for transmitting and receiving a modulated call between the at least two mobile stations; and synchronizing for establishing a connection for calls between at least the two mobile stations.

Further embodiments of the method are set forth through the attached dependent method claims corresponding to the above mentioned embodiments.

BRIEF DESCRIPTION OF THE DRAWINGS

Henceforth reference is had to the following description and the accompanying drawings for a better understanding of the present invention with its examples and embodiments, in which:

FIG. 3 illustrates diagrams of traffic measurements;

DETAILED DESCRIPTION OF PREFERRED EMBODIMENTS

Figure 1:
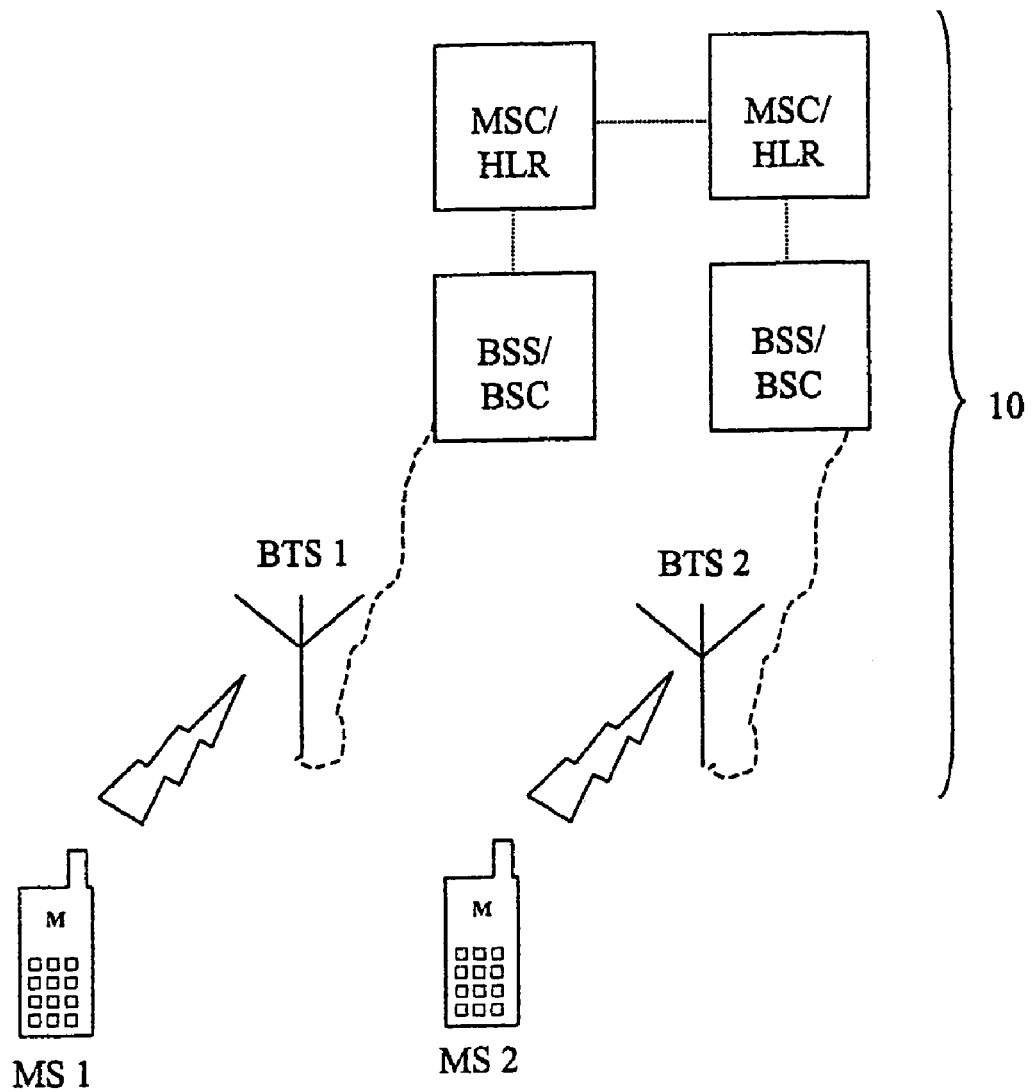
FIG. 1 schematically illustrates two mobile stations, MS 1 and MS 2, communicating in a prior art cellular mobile network.

In FIG. 1, a schematic illustration of a typical prior art mobile network 10 is outlined. Mobile telephone networks 10 exist in several standards; Examples are GSM (Europe, Australia, and parts of Asia), D-AMPS (USA), etc. Third generation standards are also diverse and include e.g. W-CDMA. Regardless of standard, some basic elements and structures are the same for all mobile network standards: Each mobile telephone is in contact with a base station which, in turn, is connected to another base station controller, responsible of the supervision of a given set of base stations. Communication in the mobile network 10 is always accomplished in a hierarchical structure: Sending mobile station MS1→Base station BTS1→Base station controller BSS/BCS→(Transmission through mobile networks and potentially also transit networks) MCS/HLR→Base station controller BSS/BSC→Base station BTS2→Receiving mobile station MS2. The chosen communication pathway structure with many intermediates brings about several potential bottlenecks, which limits the capacity of the total network 10.

Figure 2:
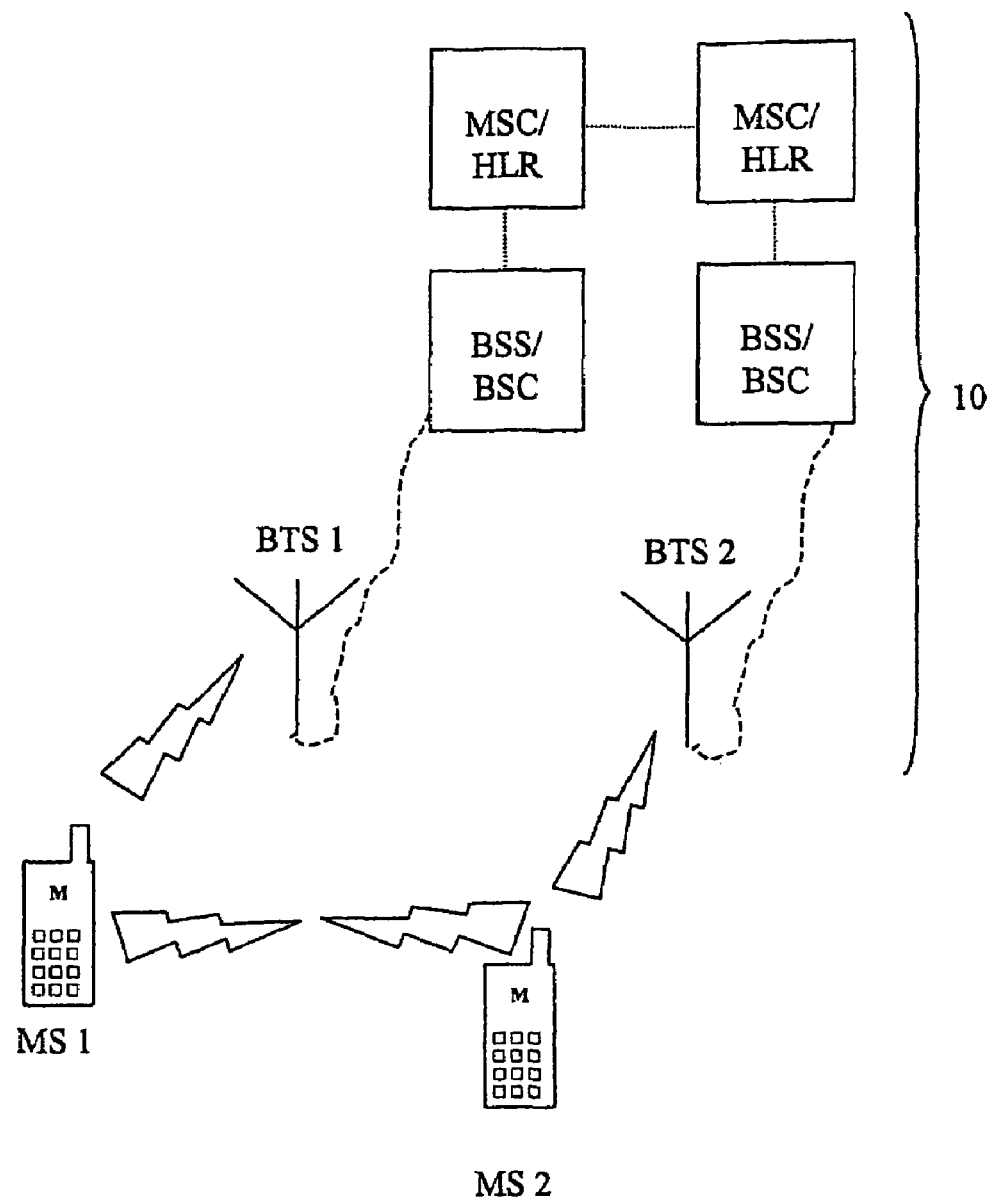
FIG. 2 schematically illustrates two mobile stations communicating in accordance with the present invention.

The present invention provides a solution to the bottleneck problem, wherein the solution is based on direct communication between mobile stations MS1 and MS2, exemplified in FIG. 2. In accordance with a preferred embodiment of the present invention, end-customers are provided with a mobile station MS capable of communication at high capacity and low costs without the need of new infrastructure and/or a new operator subscription. By using already installed mobile network infrastructure, the new mobile stations MS1, MS2 are, in addition to communication with the mobile network 10, able to directly communicate MS-to-MS, preferable over a radio interface. This means that the total system defined by the mobile network 10 as well as the MS is able to take advantage of a so far not utilized path of communication. This solution makes the communication path the shortest possible: Sending mobile station MS1→Receiving mobile station MS2 or vice versa Sending mobile station MS2→Receiving mobile station MS1. In this manner, the cost of mobile telephony of the customers, i.e. the users of mobile stations MS, could be immediately decreased in present networks 10 as well as it would make possible for future customers to use high bandwidth applications at reasonable cost levels.

By direct communication between mobile stations MS, in accordance with this preferred embodiment of the present invention, the capacity of the total mobile infrastructure network 10 increases, in a first step without the need of any change to the mobile network 10 itself. The demanded additional functionality is easily built into the mobile telephones and preferably in accordance with the preferred embodiment of the present invention as described below. An even more efficient use of the new communication pathway is gained if also the mobile network 10 is allowed to monitor and control the use of the direct communication between the mobile phones as described in a second alternative embodiment of the present invention below. If each mobile station is enabled to be used as a transmission link, the MS-to-MS communication pathways can be even more efficiently used by the mobile network for e.g. load-sharing purposes, as described in a third alternative embodiment of the present invention below. Each mobile station is then regarded as a mobile router that receives information and re-transmits the same information based on the address tag attached to each information packets. Each mobile telephone then, according to the third alternative embodiment of the invention, functions in a similar manner as compared to an Internet router that receives and re-transmits information based on the rules given by the Internet Protocol (IP).

The distance between two MS has to be short enough to enable the signal quality of the direct radio link established between them to be sufficiently strong to carry the desired information (FIG. 3*a*). The graph of FIG. 3*a* shows the signal quality of the direct communication interface between two MS (Y-axis) as a function of the distance between two MS engaged in a phone call (X-axis, assuming a log scale). In a general case, the transmission power of the radio interface used for the direct communication between the MS can be set to permit communication over longer distances. The impact of the solution according to the present invention can be determined by specifying the distribution of distances between mobile stations during regular phone calls (FIG. 3*b*). The graph of FIG. 3*b* shows the relative number of mobile telephone calls made at a given distance between two MS engaged in a phone call (Y-axis) as a function of the distance between two MS engaged in a phone call (X-axis, assuming a log scale). Based on the combined information in FIG. 3*a* and FIG. 3*b* it is possible to estimate how many mobile phone calls, in relative units, that in principle would be possible to re-direct to a direct communication between two MS engaged in a phone call, illustrated by the area a in FIG. 3*c* being defined by the y- and x-axis together with the graphs of FIG. 3*a* and FIG. 3*b* respectively. This relative estimation on the number of phone calls possible to re-direct enables to roughly determine the total increase of the capacity of the mobile network if direct communication between the MS is made possible.

In accordance with the present invention the expression "call(s)" should be broadly interpreted as including speech, asynchronous communication such as sending of digital data, SMS etc., i.e., any communication conducted through a cellular network.

Figure 4:
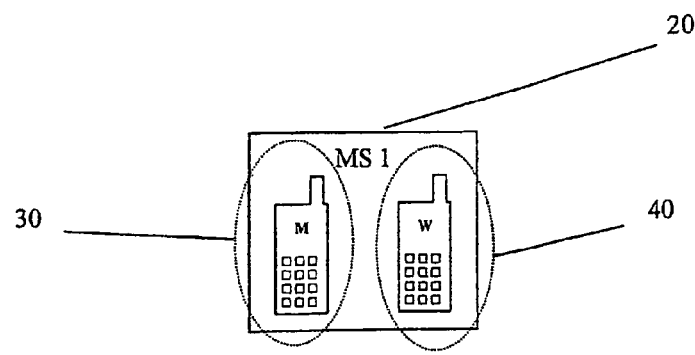
FIG. 4 schematically illustrates a mobile station in accordance with the present invention.
Figure 5:
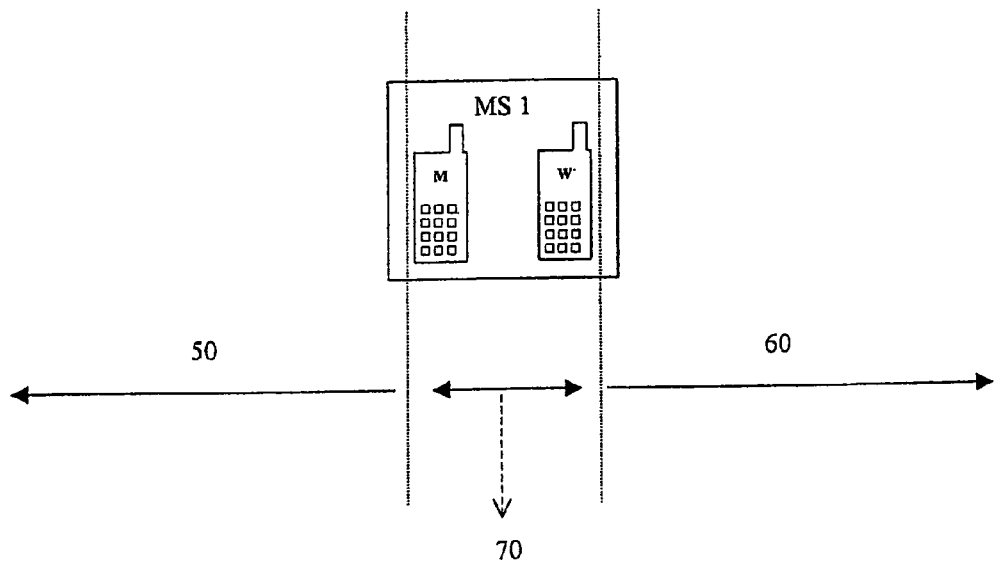
FIG. 5 schematically illustrates a radio interface in accordance with the present invention.

The embodiment of the present invention as schematically exemplified in FIG. 4, comprises that each mobile station MS is one physical object 20, having built-in capabilities. to communicate as a MS within a standardized mobile telephone network 10 as well as having built-in capability to communicate as a receiver/transmitter at a different radio frequency, for example the radio frequency used by regular communication radio. According to this embodiment, the communication within the mobile telephone network 10, including the MS, is performed independent of the direct radio communication between the MS on the communication radio frequency, depicted in FIG. 5. The MS for this purpose comprises a radio interface 50 towards the mobile network 10, a radio interface 60 for direct communication with another MS and an MS-internal interface 70 for communication between the radio communication means 30 interfacing a cellular network (10), for communication with the mobile network, and the radio communication means 40, for direct communication with another MS. The communication within the MS, between the radio means 30 used to operate and interface to the mobile telephone network and the radio means 40 used for direct communication between two MS, provides a few basic instructions in this embodiment, but it is not limited to those. See FIG. 6 for an example of a call sequence according to the preferred embodiment of the present invention that includes the instructions between radio means 30 and radio means 40. One important implication of the present invention is that a customer of a cellular phone can use the cellular phone in an existing cellular network 10, because the MS is fully transparent to the mobile network 10 according to this embodiment.

An MS 20 in accordance with the present invention thus comprises a second radio communication means 40 operating on a different frequency band, separated from cellular frequency bands, for transmitting and receiving calls outside a cellular network. This is accomplished through a direct communication link between cellular mobile stations with functionality for such a communication in accordance with the present invention.

To achieve the direct communication link an MS in accordance with the present invention is equipped with a switching means between the first and the second radio communication means 30, 40 for transferring calls between cellular frequency bands and the different (external) frequency band upon a predetermined command. This command could in one embodiment be triggered through the cellular network dedicated control channel signaling, whereby the switching means is a software interpreting such signaling and the MS 20 CPU controlling the switching operation. In another embodiment the switching means could be provided through an ASIC specifically designed for the task. Another embodiment provides that the switching means is a push button or the like for a manual switching between the frequency bands, thus disconnecting the cellular band during a direct communication. A further embodiment involves that the switching means is a speech recognition interface controlled by a processor for the frequency band switching. Combinations of switching means mentioned are also possible.

Moreover there are provided means in the second radio communication means 40 determining a carrier wave within the different frequency band for transmitting and receiving a transferred modulated call, and a synchronizing means for establishing a connection for calls over the carrier wave with another predetermined mobile station in accordance with techniques known to a person skilled in the art.

Figure 6:
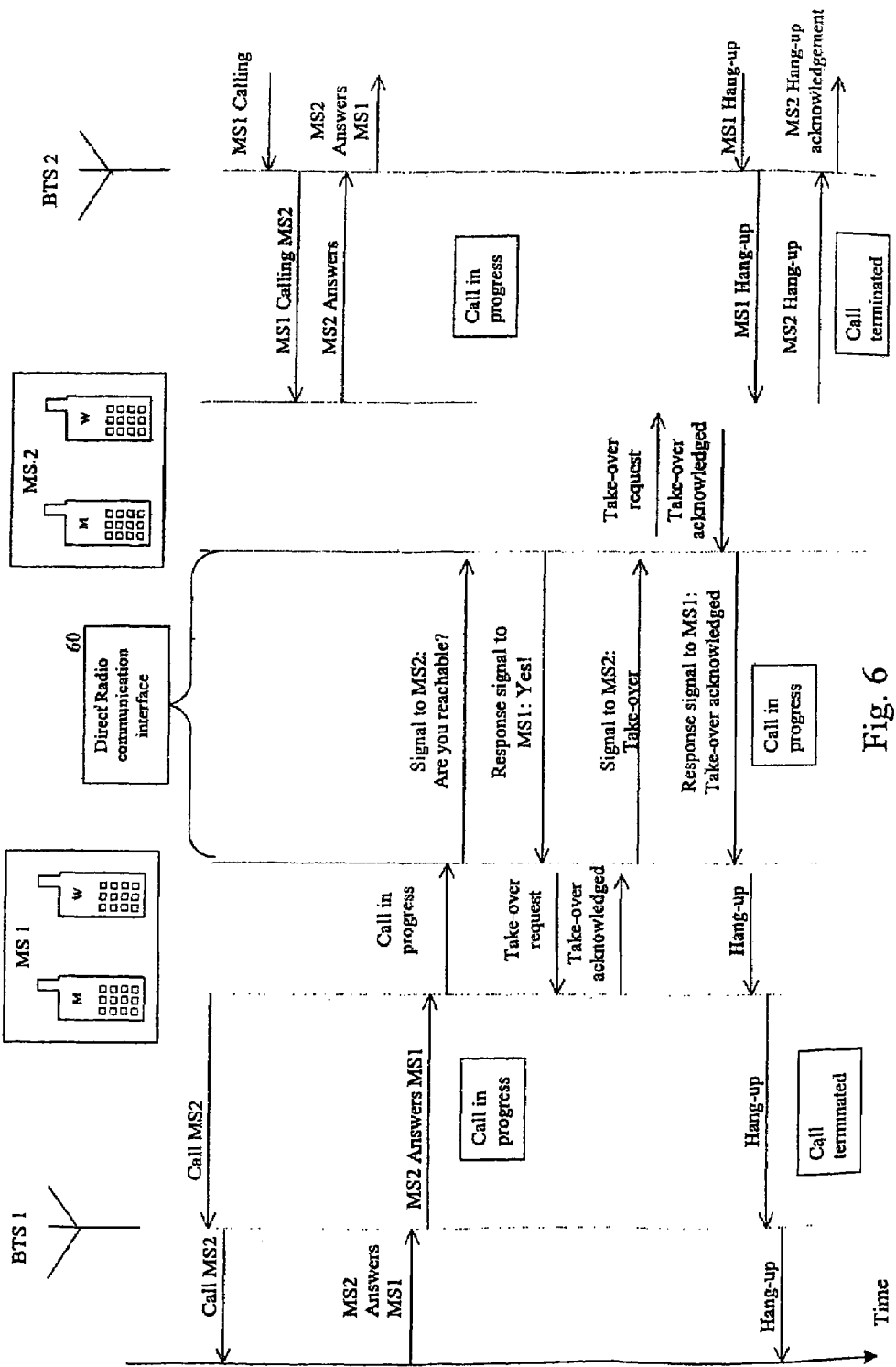
FIG. 6 schematically illustrates one embodiment of a call being established in accordance with the present invention.

The FIG. 6 depicts one example of a call scenario according to the preferred embodiment wherein; MS1 first calls MS2 via the mobile network 10 through base stations BTS 1 and BTS 2. After the call is in progress, the MS1 randomly or at predetermined intervals in time interrogates over the direct MS-to-MS radio communication link or interface 60 whether there is a free frequency available as well as a sufficient signal quality in order to allow a direct communication between MS1 and MS2. In the example in FIG. 6, MS2 responds positively and the call is re-routed to the direct MS-to-MS communication link and the initial connection over the mobile network can then be terminated thus freeing capacity on the mobile network 10. Alternatively, the user engaged in call can manually via the MS1 activate the interrogation for a free frequency and sufficient signal quality, allowing a direct communication between the mobile stations at the users discretion.

Several other call sequences can also be considered, for example the call sequence where MS1 calls MS2 on the direct MS-to-MS communication link, and thereafter re-routes the call to the mobile network.

It can be assumed situations in which two MS engaged in a call, change between the direct communication link and the mobile network several times during a phone call.

In a further embodiment of the present invention, the communication within the mobile telephone network, including the MS, is performed in cooperation with the direct radio communication between the MS1 and MS2 on the direct communication radio frequency between the MS. In the preferred embodiment of the present invention described above, the MS has the full responsibility to operate and control the direct communication interface 60. Therefore, the mobile network 10 according to this embodiment does not have to possess any knowledge or logic about the direct communication interface 60 between MS1 and MS2.

Figure 7:
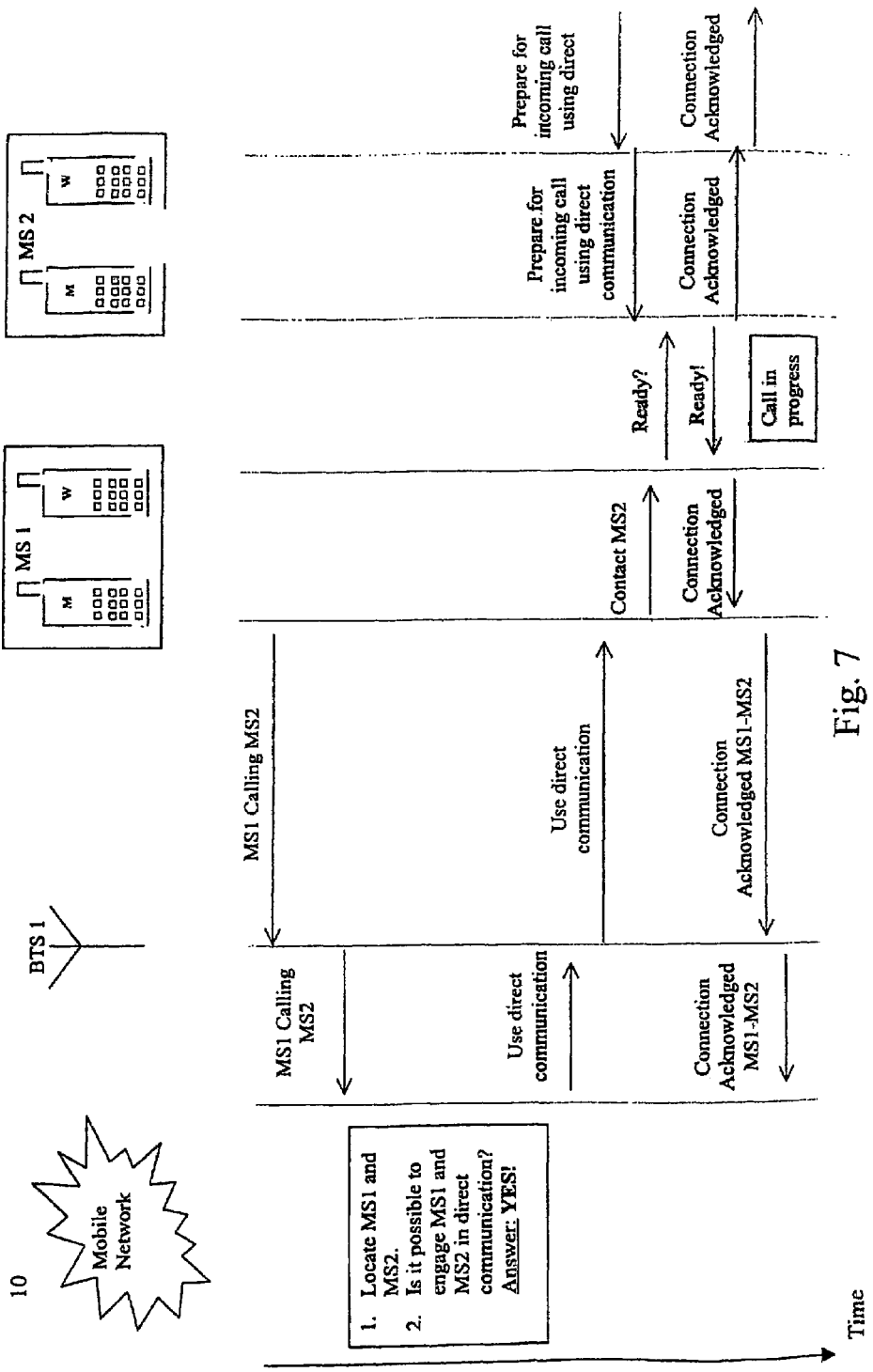
FIG. 7 schematically illustrates another embodiment of a call being established in accordance with the present invention.

In this further embodiment of the present invention as exemplified in FIG. 7, the mobile network 10 is participating with logic concerning communication pathways for information transmission between mobile stations MS, for example MS1 and MS2. Based on the knowledge about the geographical locations of MS1 and MS2, the mobile network 10 is able to take decisions to engage the direct communication interface 60 or the regular communication pathway 50 through the mobile network 10, depending on which path is the best choice at a given moment regarding available or existing signal path properties for the call, such as available frequencies, signal quality, network capacity and network load.

Logic for the solution according to this further embodiment of the present invention can for example be provided through the control channels in a cellular mobile telephone system, such as, for example, the dedicated control channels (DCCH).

FIG. 7 shows a call scenario wherein MS1 first calls MS2 via the mobile network 10. After the call is in progress, the mobile network 10 decides to re-route the call to the direct MS-to-MS radio communication link. The mobile network 10 makes such a decision directly based on the inherent full knowledge possessed by the network 10, whether or not there is a free frequency available to allow a direct communication between MS1 and MS2. The decision to re-route is also based on that an available frequency has a signal quality sufficient to allow a direct communication between MS1 and MS2. A measurement of signal strength parameters is then performed for ensuring the signal quality.

Several other call sequences can also be considered, for example the call sequence where MS1 calls MS2 on the direct MS-to-MS communication link, and the mobile network 10 decides to re-route the call to the mobile network 10 based on decision parameters in the mobile network 10 itself.

Yet another embodiment of the present invention comprises that mobile stations MS can be used as intermediate transmission links. Consequently, the direct MS-to-MS communication pathways can be even more efficiently used by the mobile network 10 for e.g. load-sharing purposes as exemplified in FIG. 8 and FIG. 9. Each mobile station MS then acts as a mobile router that receives information and re-transmits the same information based on a provided address tag attached to each information packet. Each mobile telephone then functions in a similar manner as an Internet router that receives and re-transmits information based on the rules given by the Internet Protocol (IP).

Figure 8:
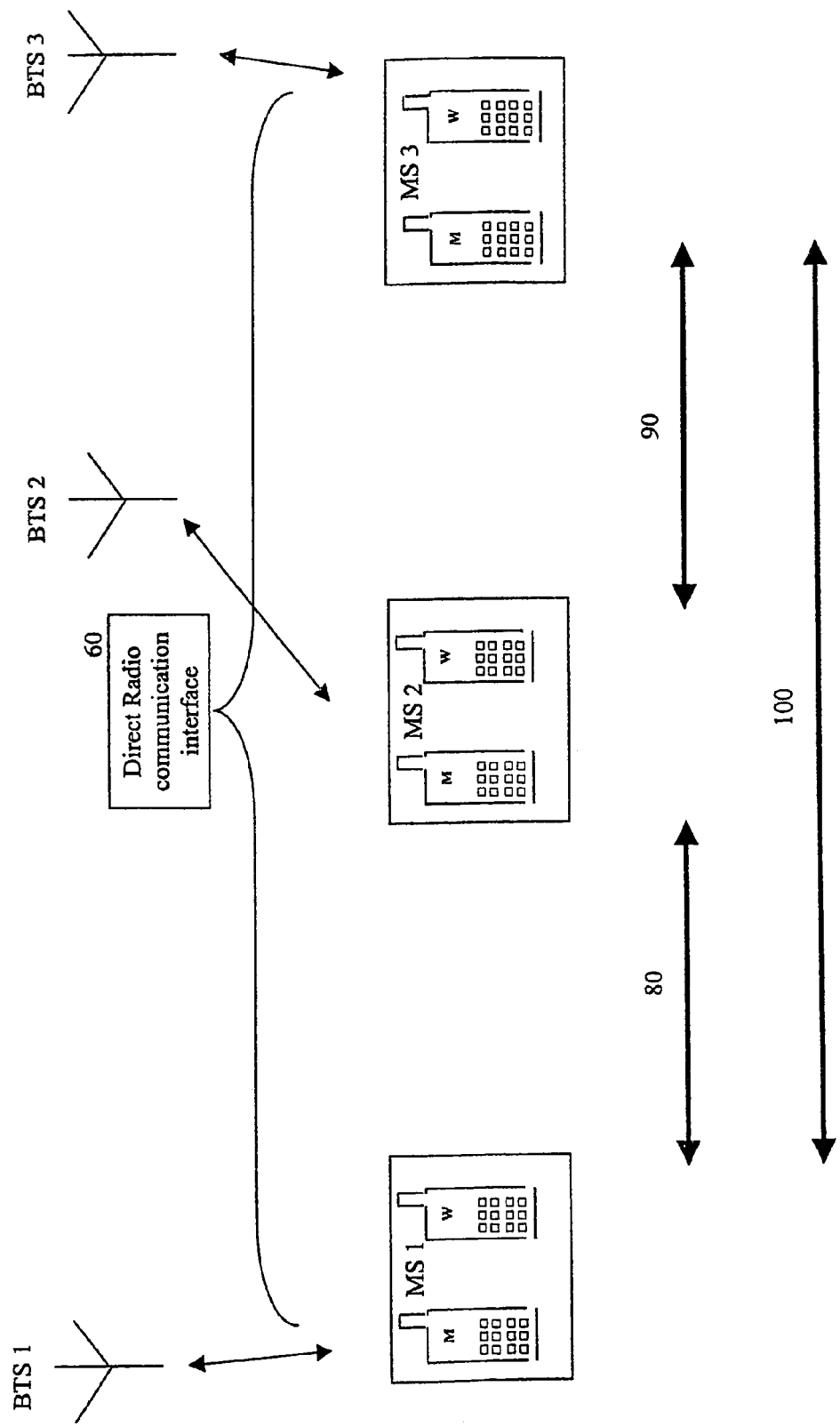
FIG. 8 schematically illustrates mobile stations being utilized as intermediate devices in accordance with the present invention.

FIG. 8 shows the principle of this embodiment of the present invention regarding the use of a Mobile Station MS as an intermediate transmission link, for example MS2 in FIG. 8, between the peer MS, for example MS1 and MS3 in FIG. 8, that constitute the communicating end-points of the transmission pathway. According to this example, information from MS 1 will travel or be routed via physical communication pathways 80, 90 to MS3 utilizing MS2 as a mobile router, which to this end forwards the information from MS1 to MS 3 in accordance with address tags attached to the information packets. For the users of MS1 and MS3, the information or data from MS1 to MS3 is perceived logically communicated directly via pathway 100, as through a direct communication link between MS1 and MS3, for example according to the preferred embodiment of the present invention described above, since the actual physical communication pathways 80, 90 of the transmitted information via MS2, preferably is made invisible or not known for the users. In the alternative embodiment of the invention, the physical communication pathways 80, 90 are made visible or known for the users of MS1 and MS3, and MS 2 can then be designated as end-receiver of selected information during an established communication between MS1 and MS3 through attaching the address tag for MS2 to the information or data packets. It is also possible to combine the use of an MS as an intermediate transmission link and the transmission pathways of the mobile network.

Figure 9:
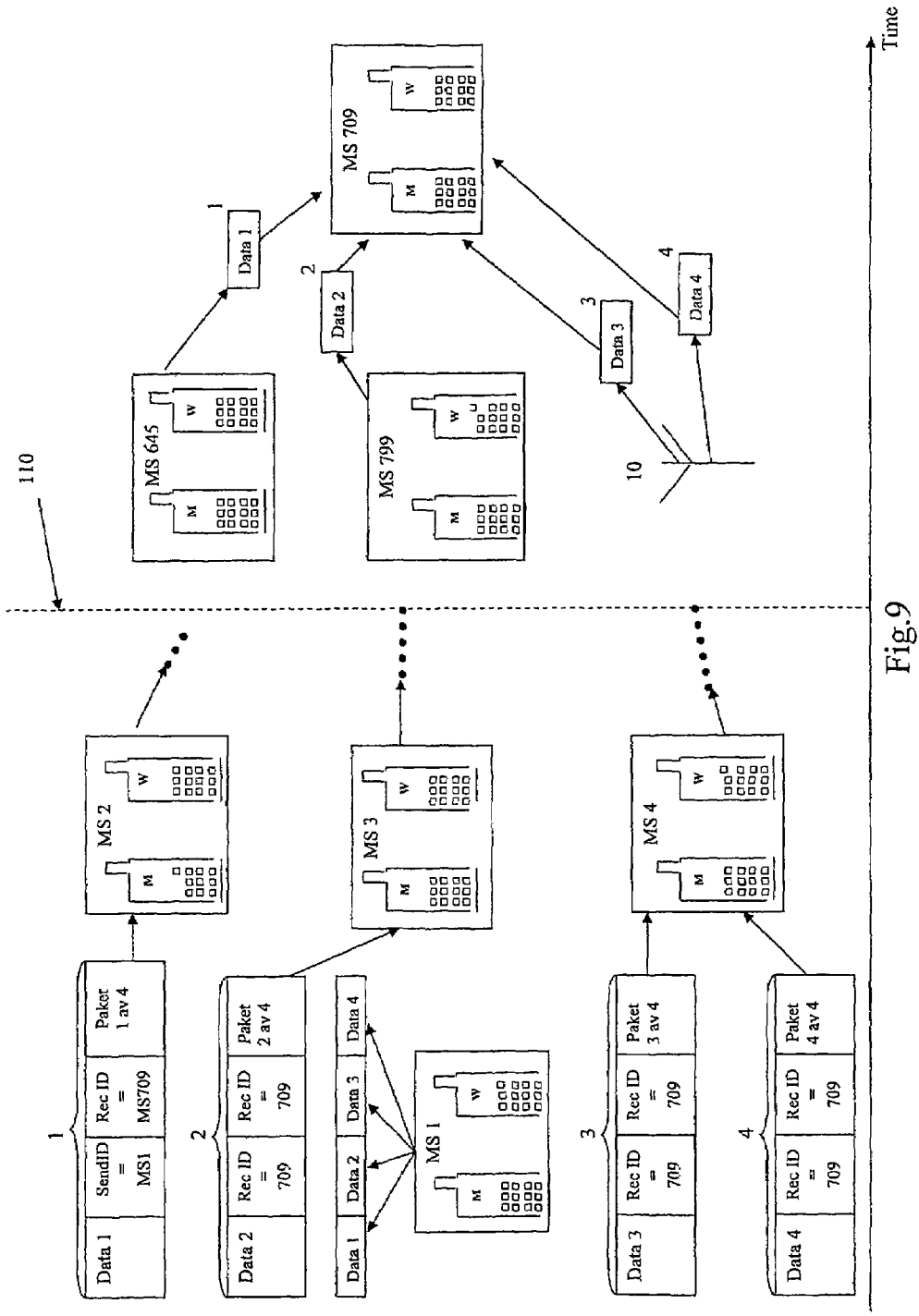
FIG. 9 schematically illustrates examples of data packet traffic in accordance with the present invention.

FIG. 9 depicts an example regarding the transmission of specific data from MS1 to MS709. The data is broken down into standardized size information packets, illustrated by Data 1 through Data 4 in the example in FIG. 9. Based on the destination address, being MS709 in the example in FIG. 9, the individual data packet, Data 1, Data 2, Data 3 and Data 4 are sent as separate information blocks using the direct MS-to-MS communication capability as well as the capability of data transmission within the mobile network 10. The vertically extending broken line 110 represents several intermediate transmissions via MS as well as via the mobile network 10 of the four data packets 1, 2, 3, 4 during their transport towards MS709. Data packet 1 is initially sent from MS1 to MS2 for further re-routing onwards via MS645 in turn re-routing the data packet 1 to MS709. Data packet 2 is initially sent from MS1 to MS3 for further re-routing via MS799 onwards to MS709. Data packets 3 and 4 are initially sent from MS1 to MS4 for further re-routing onwards. The mobile network 10 then receives the re-routed data packets 3 and 4 from MS4, not being possible to route via a MS-to-MS communication, and the packets 3 and 4 are then transmitted onwards to MS709 from the mobile network 10.

In this embodiment of the present invention the mobile network 10 is supervising the transmission of relevant information between MS rather than having the information transferred through the mobile network 10. The solution according to this embodiment of the present invention is optimized regarding direct MS-to-MS communication in order to increase the capacity of the total system, the total system being defined as both the mobile network 10 and the mobile stations using that mobile network 10. Hence, this embodiment of the present invention may be favorable to high-bandwidth applications, especially those that can allow a degree of asynchronous transmission.

An implication of this relates to the fact that a mobile station MS, not itself being engaged in communication, is more or less frequently used as an intermediate transmission link.

Switching means can for example be software, for automatic transferal of calls between cellular frequency bands and a different frequency band according to preset switching parameters, comprised in the mobile network base stations or alternatively calls can be switched between frequency bands upon a manual command via the mobile station MS.

In one embodiment of the present invention, the mobile network is monitoring and controlling the switching means.

Synchronizing means can for example be software for synchronizing reading commands on the mobile network control channels during a switching sequence for a call.

It is appreciated that the means used in the present invention are hardware means or software means or a combination of both.

The present invention is not restricted to given embodiments or examples, but the attached set of claims define other embodiments for a person skilled in the art.

The invention claimed is:

1. In a cellular telephony system, a method for communicating between at least first and second mobile stations, said mobile stations each comprising a first radio communicator interfacing a cellular network, operating on at least one cellular frequency band for transmitting and receiving calls through said network, said first and second mobile stations each having a second radio communicator operating on a different frequency band and separated from cellular frequency bands, said second radio communicator transmitting and receiving calls through direct communication between at least two of said cellular mobile stations, said mobile stations switching between said first and said second radio communicator for transferring calls between cellular frequency bands and said different frequency band upon a command, wherein the method for communicating comprises:

determining via said second radio communicator a mutual carrier wave within said different frequency band available for transmitting and receiving a modulated call between said first and second mobile stations;

measuring signal strength parameters for ensuring the signal quality;

deciding, based on whether the available frequency has a signal quality sufficient to allow a direct mobile station-to-mobile station radio communication link between the first and second mobile stations, whether to connect the call via the direct mobile station-to-mobile station radio communication link; and establishing a direct connection for the call between said first and second mobile stations, thereby extending call capacity of the cellular network.

2. A method according to claim 1, further comprising deciding, based on whether the available frequency has a signal quality sufficient to allow a direct communication between the first and second mobile stations and, after the mobile cellular call is in progress, to re-route the call to the direct mobile station-to-mobile station radio communication link.

3. A method according to claim 2, further comprising deciding, based on inherent knowledge possessed by the cellular network, whether there is a free frequency available to allow a direct communication between the first and second mobile stations and to re-route the call to the mobile network based on decision parameters in the cellular network itself.

4. A method according to claim 1, further comprising deciding, based on inherent knowledge possessed by the cellular network, whether there is a free frequency available to allow a direct communication between the first and second mobile stations and to re-route the call to the mobile network based on decision parameters in the cellular network itself.

5. A method according to claim 1, further comprising using the mobile Stations' direct mobile station-to-mobile station communication pathways as intermediate transmission links for re-transmitting the information received based on a provided address tag attached to each information packet to increase efficiency of the cellular network.

6. A method according to claim 5, further comprising increasing efficiency via load sharing.

7. A method according to claim 1, further comprising using each mobile station as an Internet router that receives that re-transmits information based on rules provided by the Internet Protocol (IP).

8. A method according claim 1, further comprising supervising the transmission of relevant information between mobile stations rather than having the information transferred through the cellular network.

9. A method according to claim 1, further comprising:
breaking down call data into standardized size information packets; and
sending, based on a destination address from the call data, individual data packets as separate information blocks using the direct mobile station-to-mobile station communication capability together with data transmission capabilities of the cellular network, thereby using both communication links for a single telephone call.

10. A method according to claim 1, further comprising after a call is in progress, randomly or at predetermined intervals in time, causing the first mobile station to determine over the direct mobile station-to-mobile state radio communication link or interface whether there is a free frequency available as well as a sufficient signal quality to allow for direct communication between the first and second mobile stations.

11. A method according to claim 10, further comprising when the second mobile station positively, re-routing the call to the direct mobile station-to-mobile station communication link and terminating the initial connection, thereby freeing capacity of the cellular network.

12. A method according to claim 1, further comprising after a call is in progress, in response to a user input, causing the first mobile station to determine over the direct mobile station-to-mobile state radio communication link or interface whether there is a free frequency available as well as a sufficient signal quality to allow for direct communication between the first and second mobile stations.

13. A method according to claim 1, further comprising re-routing a call between the first and second mobile stations initiated on the direct mobile station-to-mobile station communication link to the cellular frequency band of the cellular network.

14. A method according to claim 1, further comprising changing between the direct mobile station-to-mobile station communication link to and cellular frequency band of the cellular network one or more time during a single phone call.

15. A cellular telephony system including at least first and second mobile stations, said mobile stations each comprising a first radio communicator interfacing a cellular network, operating on at least one cellular frequency band for transmitting and receiving calls through said network, said first and second mobile stations each having a second radio communicator operating on a different frequency band and separated from cellular frequency bands, said second radio communicator transmitting and receiving calls through direct communication between at least two of said cellular mobile stations, said mobile stations switching between said first and said second radio communicator for transferring calls between cellular frequency bands and said different frequency band upon a command, wherein the cellular telephony system comprises communication routing programmed logic circuitry configured to:
determine via said second radio communicator a mutual carrier wave within said different frequency band available for transmitting and receiving a modulated call between said first and second mobile stations;
measure signal strength parameters for ensuring the signal quality;
decide, based on whether the available frequency has a signal quality sufficient to allow a direct mobile station-to-mobile station radio communication link between the first and second mobile stations, whether to connect the call via the direct mobile station-to-mobile station radio communication link; and
establish a direct connection for the call between said first and second mobile stations, thereby extending call capacity of the cellular network.

16. The system of claim 15, wherein the communication routing programmed logic circuitry is further configured to decide, based on whether the available frequency has a signal quality sufficient to allow a direct communication between the first and second mobile stations and, after the mobile cellular call is in progress, to re-route the call to the direct mobile station-to-mobile station radio communication link.

17. The system of claim 16, wherein the communication routing programmed logic circuitry is further configured to decide, based on inherent knowledge possessed by the cellular network, whether there is a free frequency available to allow a direct communication between the first and second mobile stations and to re-route the call to the mobile network based on decision parameters in the cellular network itself.

18. The system of claim 15, wherein the communication routing programmed logic circuitry is further configured to decide, based on inherent knowledge possessed by the cellular network, whether there is a free frequency available to allow a direct communication between the first and second mobile stations and to re-route the call to the mobile network based on decision parameters in the cellular network itself.

19. The system of claim 15, wherein the communication routing programmed logic circuitry is further configured to use the mobile stations' direct mobile station-to-mobile station communication pathways as intermediate transmission links for re-transmitting the information received based on a provided address tag attached to each information packet to increase efficiency of the cellular network.

20. The system of claim 19, wherein the communication routing programmed logic circuitry is further configured to increase efficiency via load sharing.

21. The system of claim 15, wherein the communication routing programmed logic circuitry is further configured to use each mobile station as an Internet router that receives that re-transmits information based on rules provided by the Internet Protocol (IP).

22. The system of claim 15, wherein the communication routing programmed logic circuitry is further configured to supervise the transmission of relevant information between mobile stations rather than having the information transferred through the cellular network.

23. The system of claim 15, wherein the communication routing programmed logic circuitry is further configured to (a) break down call data into standardized size information packets; and (b) send, based on a destination address from the call data, individual data packets as separate information blocks using the direct mobile station-to-mobile station communication capability together with data transmission capabilities of the cellular network, thereby using both communication links for a single telephone call.

24. The system of claim 15, wherein the communication routing programmed logic circuitry is further configured to cause, after a call is in progress, randomly or at predetermined intervals in time, the first mobile station to determine over the direct mobile station-to-mobile state radio communication link or interface whether there is a free frequency available as well as a sufficient signal quality to allow for direct communication between the first and second mobile stations.

25. The system of claim 24, wherein the communication routing programmed logic circuitry is further configured to re-route, when the second mobile station positively, the call to the direct mobile station-to-mobile station communication link and terminating the initial connection, thereby freeing capacity of the cellular network.

26. The system of claim 15, wherein the communication routing programmed logic circuitry is further configured to cause, after a call is in progress, in response to a user input, the first mobile station to determine over the direct mobile station-to-mobile state radio communication link or interface whether there is a free frequency available as well as a sufficient signal quality to allow for direct communication between the first and second mobile stations.

27. The system of claim 15, wherein the communication routing programmed logic circuitry is further configured to re-route a call between the first and second mobile stations initiated on the direct mobile station-to-mobile station communication link to the cellular frequency band of the cellular network.

28. The system of claim 15, wherein the communication routing programmed logic circuitry is further configured to change between the direct mobile station-to-mobile station communication link to and cellular frequency band of the cellular network one or more time during a single phone call.

* * * * *